United States Patent [19]
Hackel et al.

[11] Patent Number: 6,037,565
[45] Date of Patent: Mar. 14, 2000

[54] LASER ILLUMINATOR AND OPTICAL SYSTEM FOR DISK PATTERNING

[75] Inventors: Lloyd A. Hackel; C. Brent Dane; Shamasundar N. Dixit, all of Livermore; Mathew Everett, Pleasanton; John Honig, Livermore, all of Calif.

[73] Assignee: The Regents of the University of California, Oakland, Calif.

[21] Appl. No.: 08/665,275

[22] Filed: Jun. 17, 1996

[51] Int. Cl.[7] .................................................. B23K 26/00
[52] U.S. Cl. ............................ 219/121.73; 219/121.68; 219/121.77
[58] Field of Search ..................... 219/121.73, 121.68, 219/121.69, 121.75, 121.76, 121.77; 264/400; 346/135.1; 372/102; 369/100, 44.26; 359/327, 565; 700/166; 364/474.08

[56] References Cited

U.S. PATENT DOCUMENTS

| | | | |
|---|---|---|---|
| 4,928,132 | 5/1990 | Pettigrew et al. | 346/135.1 |
| 5,029,243 | 7/1991 | Dammann et al. | 219/121.77 |
| 5,113,286 | 5/1992 | Morrison | 359/569 |
| 5,195,103 | 3/1993 | Hinton et al. | 372/102 |
| 5,243,589 | 9/1993 | Stuke et al. | 369/100 |
| 5,362,940 | 11/1994 | MacDonald et al. | 219/121.68 |
| 5,416,298 | 5/1995 | Roberts | 219/121.68 |
| 5,453,814 | 9/1995 | Aryer | 359/327 |
| 5,463,200 | 10/1995 | James et al. | 219/121.68 |
| 5,477,383 | 12/1995 | Jain | 359/565 |
| 5,481,407 | 1/1996 | Smith et al. | 219/121.68 |
| 5,530,641 | 6/1996 | Kanehira | 369/44.26 |
| 5,571,429 | 11/1996 | Smith et al. | 219/121.73 |
| 5,586,040 | 12/1996 | Baumgart et al. | 364/474.08 |
| 5,595,768 | 1/1997 | Treves et al. | 264/400 |
| 5,739,502 | 4/1998 | Anderson et al. | 219/121.75 |

FOREIGN PATENT DOCUMENTS

| | | | |
|---|---|---|---|
| 63-281790 | 11/1988 | Japan | 219/121.75 |
| 8-227521 | 9/1996 | Japan . | |

*Primary Examiner*—Geoffrey S. Evans
*Attorney, Agent, or Firm*—John P. Wooldridge

[57] ABSTRACT

Magnetic recording media are textured over areas designated for contact in order to minimize friction with data transducing heads. In fabricating a hard disk, an aluminum nickel-phosphorous substrate is polished to a specular finish. A mechanical means is then used to roughen an annular area intended to be the head contact band. An optical and mechanical system allows thousands of spots to be generated with each laser pulse, allowing the textured pattern to be rapidly generated with a low repetition rate laser and an uncomplicated mechanical system. The system uses a low power laser, a beam expander, a specially designed phase plate, a prism to deflect the beam, a lens to transmit the diffraction pattern to the far field, a mechanical means to rotate the pattern and a trigger system to fire the laser when sections of the pattern are precisely aligned. The system generates an annular segment of the desired pattern with which the total pattern is generated by rotating the optical system about its optic axis, sensing the rotational position and firing the laser as the annular segment rotates into the next appropriate position. This marking system can be integrated into a disk sputtering system for manufacturing magnetic disks, allowing for a very streamlined manufacturing process.

22 Claims, 4 Drawing Sheets

LASER ILLUMINATOR AND OPTICAL SYSTEM FOR DISK PATTERNING

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to magnetic recording media, and more specifically, it relates to systems for controllably patterning magnetic recording disks.

2. Description of Related Art

Magnetic recording disks are required to have areas which are controllably textured, especially areas where the transducing head is allowed to contact the disk. The texturing reduces the friction encountered by the head during the "spin up" allowing more rapid disk activation and reduced wear on the heads. In current manufacturing processes, the texturing is accomplished in an off line step prior to the main manufacturing which occurs in the disk sputtering system. This texturing is currently done with an abrasive grit based process and requires costly cleaning of the disk prior to insertion into the sputtering system.

A process using a low power focused laser output to generate texture spots has been discussed (Ranjan et al., U.S. Pat. No. 5,062,021) but no practical means of implementing the process, which requires as many as 200,000 texture spots on a disk, was discussed. In this process, the short pulse output (15 ns) of a low power laser (4 $\mu$J) is focused to a spot size of roughly 10 $\mu$m diameter. The laser energy locally heats the substrate and produces a small crater with a rim rising above the substrate surface. The integrated surface area projected locally by the rims is significantly less than that of the polished substrate. Consequently friction is significantly reduced and disk performance and lifetime greatly improved.

It is desirable to build a disk marking process station as a stand alone system and/or to incorporate a laser marking process as a station in a disk sputtering system process. However, so as not to impede the throughput rate of the system, the roughly 200,000 texture spots need to be created in less than 6 seconds. A spot by spot marking of the texture pattern, as discussed in Ranjan et al., is impractical.

SUMMARY OF THE INVENTION

It is an object of the present invention to provide a method and apparatus for controllably patterning or texturing magnetic recording disks.

The invention uses a diffractive optic to generate thousands of appropriately distributed spots with a single laser pulse. This pattern of spots is rotated to a new position by rotating the diffractive optic and a deflecting prism or by rotating the disk itself. A mask can be used in front of the disk to precisely define the area that is marked. A laser timing system precisely fires the laser when the pattern (or disk) is rotated to the appropriate position. Using this process a complete textured pattern can be printed in a few seconds.

This system for patterning magnetic recording media includes a laser for producing a laser beam and a beam expanding telescope for producing an expanded laser beam. An optical assembly is positioned to recieve the laser beam, and the assembly includes a phase plate having a binary surface relief pattern designed to produce a near-equal intensity spot array. The assembly also includes a lens and a deflection wedge. The diffraction grating, lens and deflection wedge are mounted in tandem on the inner surface of a cylindrical optical mount. The system includes a method to precisely determine the focal position of the focusing lens. For example, with a confocal reflector placed at the image plane, and a beamsplitter operatively placed between the phase plate and the focusing lens such that light reflected from the beamsplitter will pass through a shear plate, parallel fringes will be produced in the shear plate when the reflector is positioned at the focus of the lens. The reflector will be precisely positioned when the fringes are aligned with the reference on the shear plate. A CCD camera may be positioned to observe the fringes. An alignment disk has a central opening that is attached to the outer surface of the cylindrical mount. The alignment disk has 18 index holes evenly spaced along its outer perimeter, and the outer radial edge of the alignment disk includes a first set of gear teeth. The alignment disk is rotated by a system including a motor with a shaft connecting the motor to a gear member with a second set of gear teeth which mesh with the first set of gear teeth. A triggering system provides a trigger pulse to the laser when a photodiode detects a trigger beam from a light emitting diode.

DETAILED DESCRIPTION OF THE INVENTION

The invention includes an illumination system that produces an annular pattern of spots. In one embodiment, 10 micron diameter spots are spaced 50 $\mu$m in the radial direction and 100 $\mu$m along the arc length. The annulus diameter is 35 mm. The pattern is made by an adjoining set of annular sections each with 17.5 mm inner radius, 3 mm thickness and an arc length of 6.11 mm (20° arc length). Thus each segment consists of an array of 60×60 spots. The annulus will be completed with 18 segments.

The illumination system comprises a laser source followed by an optical system to produce the array of spots. This optical system contains a specially designed phase plate to produce the desired annular array of spots. Following the phase plate is a deflection wedge designed to place the spot array segments at the appropriate radius. A beam expansion telescope is placed between the diffraction optics and the laser source to produce the required laser beam diameter to achieve a speckle size appropriate to the 10 $\mu$m spot diameter for the multiple spots in the far field. In one embodiment, the illumination system will produce an array segment of 60 by 60 holes (3600) on each laser pulse. The assembly will be rotated by a planetary gear assembly allowing the deflection wedge (prism) to rotate the projected laser pattern systematically around the annulus. When the annulus is completed with 18 segments, the assembly will be rotated 20° per pulse.

Figure 1A:
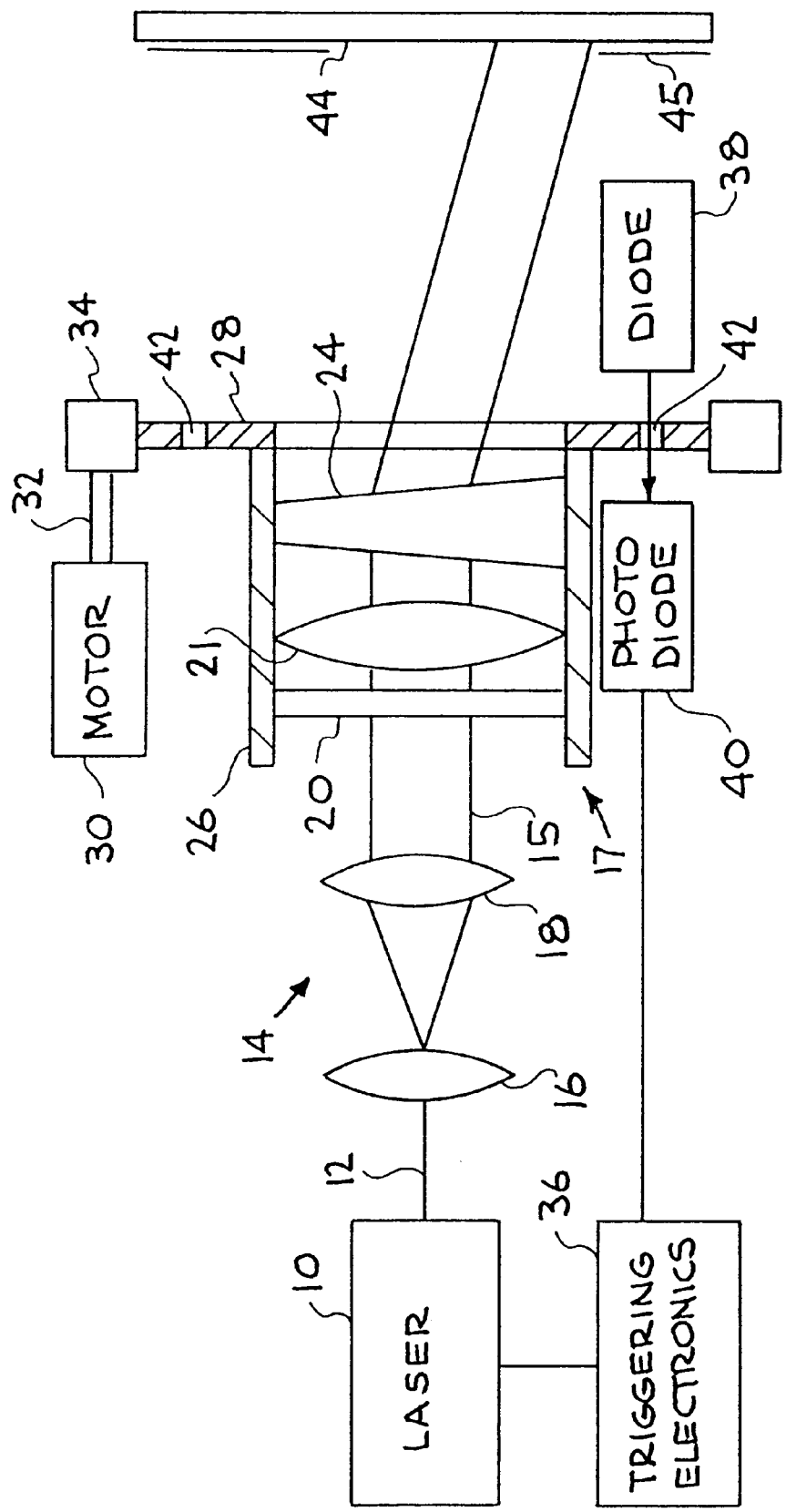
FIG. 1A shows an embodiment of the laser patterning system where the array of spots rotates to produce an annular pattern on the magnetic recording media.
Figure 2:
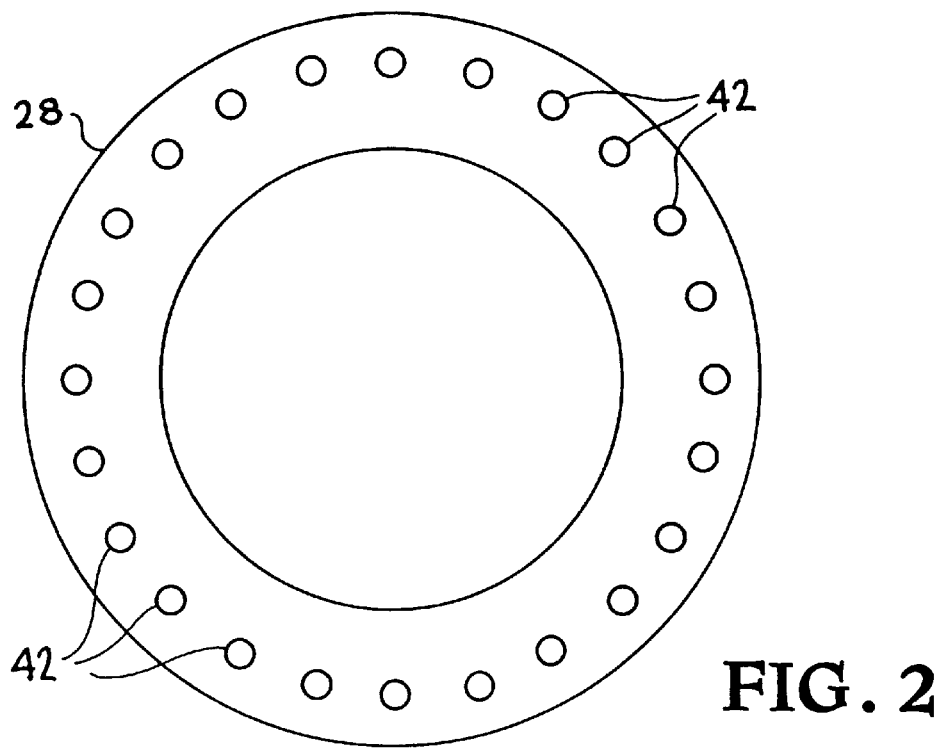
FIG. 2 shows the alignment disk with index holes.

Referring to FIG. 1A, the laser patterning system comprises a laser 10 having an output beam 12 that is expanded with e.g., a beam expanding telescope 14 having two positive optics 16, 18. The expanded beam 15 then enters a rotatable optical assembly 17 comprising a specially designed phase plate 20, a focusing lens 21 and a deflection wedge 24. These 3 elements are held together in unison by inserting them in tandem in e.g., a cylindrical mount 26, which is connected to an alignment disk 28. The phase plate 20 introduces phase aberrations in the expanded beam 15 in a manner discussed below, to produce an array of spots on the disk 44. The lens focuses the wavefront, transforming at its focus the phase information imprinted on the beam by the phase plate into the desired pattern of spots. To accomplish rotation of the rotatable optical path, a motor 30 with shaft 32 turns a planetary gear train 34 which drives alignment disk 28. Shaft 32 may include a precision encoder to provide position information of the array of spots relative to the magnetic recording media. The laser 10 is triggered by triggering electronics 36 when light from a light emitting diode 38 is detected by photodiode 40 after passing through the index holes 42 (FIG. 2) of alignment disk 28. An opaque mask 45 may be used in front of the disc 44 to precisely define the area that is to be marked.

Figure 1B:
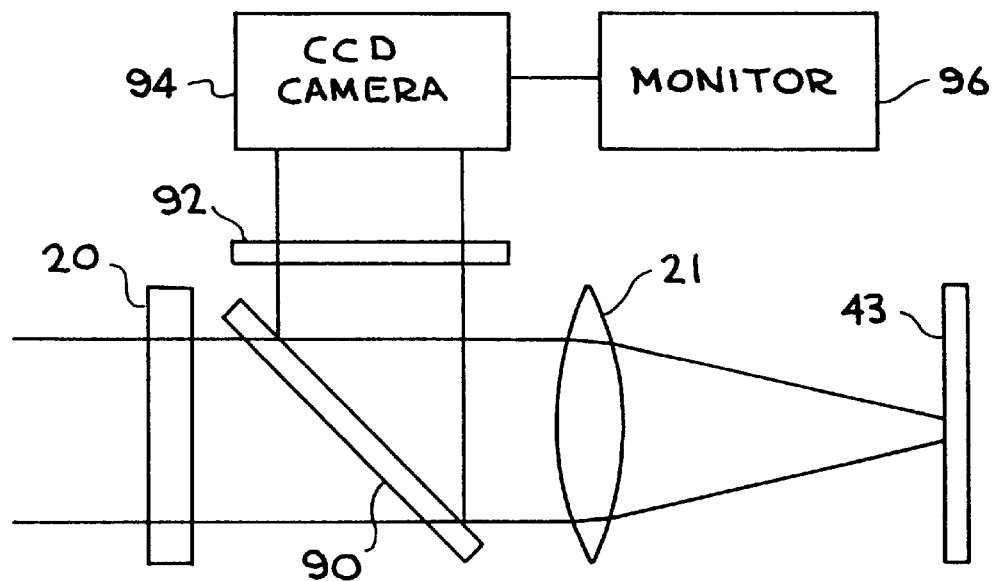
FIG. 1B shows a means for precisely focusing an array of spots.

Referring to FIG. 1B, the system includes a method to precisely determine the focal position of the focusing lens 21. For example, with a confocal reflector 43 placed at the image plane (where the magnetic recording media 44 of FIG. 1A should be placed), and a beamsplitter 90 operatively placed between the phase plate 20 and the focusing lens 21 such that light reflected from the beamsplitter 90 will pass through a shear plate 92, parallel fringes will be produced in the shear plate 92 when the reflector 43 is positioned at the focus of the lens 21. The reflector 43 will be precisely positioned when the fringes are aligned with the reference on the shear plate. A CCD camera 94 or equivalent and monitor 96 may be positioned to observe the fringes.

To transmit 4 µJ per pulse to 10 µm diameter spots at disk 44 (assuming a working margin of 2) will require that laser 10 provide 20 mJ per pulse. The laser 10 must have a pulse length of 5 to 50 ns and output pulses at a rate of 6 Hz. The optical system 17 is mounted onto disk 28 which is configured to slowly rotate through a complete annulus of the pattern projected onto disk 44 in 3 seconds. The index holes 42 of disk 28 must be precisely placed to coincide with laser fire points. The light emitting diode 38 and detector 40 are positioned to generate a trigger signal when the wheel rotates into correct position. This will be accomplished by rotating the rotatable optical assembly 17 at ⅓ Hz rate and precisely in time firing the laser when the assembly has appropriately rotated to the next position. This system will place the laser spots with several micron accuracy.

Figure 3:
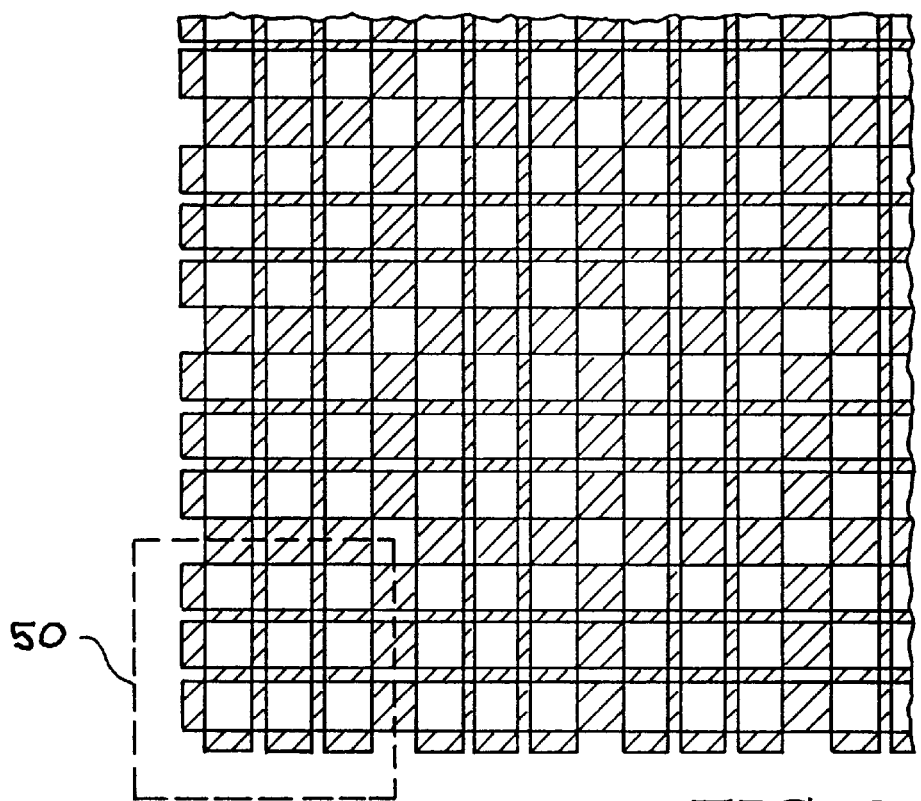
FIG. 3 shows a contiguous repetition of unit cells in x- and y-directions on the phase plate.

The phase plate 20 is designed to produce a laser spot array on the disk 44 and consists of a contiguous repetition of unit cells 50 in x- and y-directions as shown in FIG. 3. Each unit cell in turn consists of a distribution of regions that introduce phase delays of 0 or $\pi$ to the beam. Since only two values of phase delay (0 or $\pi$) are impressed upon the beam, such a phase plate is known as a binary phase plate. The 0–$\pi$ phase transition locations within each zone are chosen such that the intensities at the central m orders are nearly equal.

The procedures for designing such phase plates (also known as Dammann gratings) are described elsewhere in the literature. The example shown in FIG. 3 leads to a 7 by 7 near-equal intensity spot array in the focal plane. In the actual use for disk patterning, the phase plate is designed to produce a 60 by 60 spot array.

The separation of the spots and the size of each individual spot can be calculated as follows. If d denotes the size of each unit cell and D the size of the expanded beam, then the spots are separated by the consecutive grating orders ($\lambda$f/d). The spot size is determined by the diffraction limited size of the full beam (2$\lambda$f/D). Here $\lambda$ denotes the laser wavelength and f the focal length of the lens. Thus, the spot separation can be controlled by changing the size of the unit cell (d) and the spot size can be controlled by varying the beam size (D).

The efficiency of the binary Dammann grating, defined as the ratio of the amount of energy contained among the desired equal intensity spots to the total incident beam energy, is about 45%. The remainder of the incident energy is scattered into a large number of diffraction orders. This energy loss can be reduced if a multi-level phase grating is used to generate the spot array. Such a phase grating would have a continuously varying phase within each unit cell. The design and manufacturing of such gratings is more difficult and time consuming than a simple binary grating. However, for a commercial process in which many gratings would be required, it would only be necessary to design, expose and etch a negative master grating and then as many as required replica gratings could be made.

The binary phase plate can be fabricated in fused silica using photolithographic techniques. First, the fused silica substrate is coated with photoresist. A binary transmission mask is prepared on a piece of acetate film. The transmitting and opaque regions correspond to 0 and $\pi$ phase delay regions on the phase plate. The coated photoresist is exposed through this binary mask and the exposed part is developed away. The unexposed photoresist acts as a protective layer for fused silica during the etch step where a precise thickness of the silica substrate is removed by etching it in a buffered hydrofluoric acid solution. The required etch depth is given by $\lambda$/(n-1) where n is the substrate refractive index at the operating wavelength $\lambda$. Following the etch step, the remaining photoresist is washed off leaving a binary etch pattern in fused silica.

Figure 4:
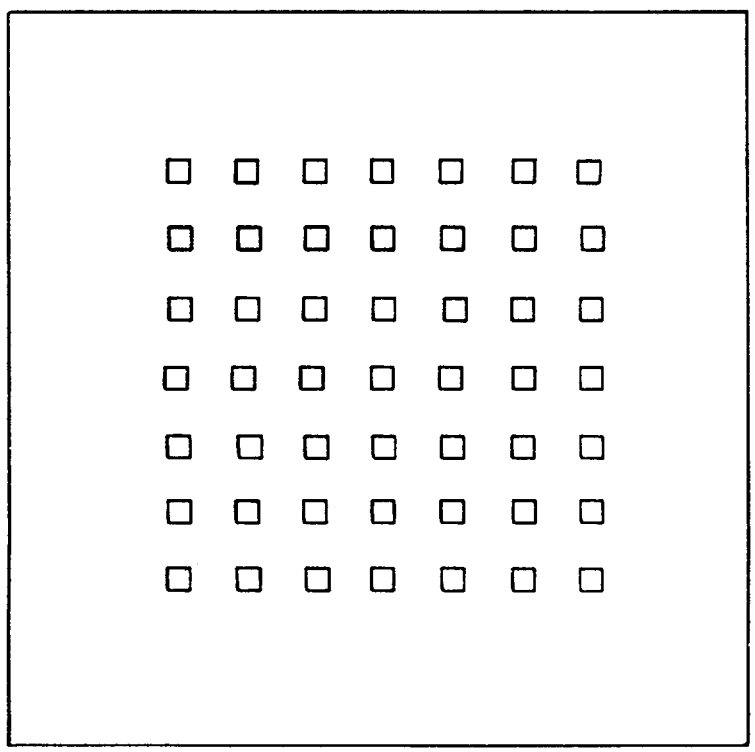
FIG. 4 shows the optical pattern produced by one such Dammann grating.

The optical pattern produced by one such Dammann grating is shown in FIG. 4. Here a single laser beam is diffracted into a 7×7 array of near uniform intensity beams. To achieve this profile, the output of the laser beam is expanded to nearly fill the 10 cm by 10 cm grating. After passing through the grating, the diffracted light is collected and focused by an appropriate short focal length lens producing in the far field, the pattern shown in FIG. 4. When masked to block the residual light beyond the central 7×7 array, this pattern can be used to print 49 spots with each laser pulse.

Figure 5:
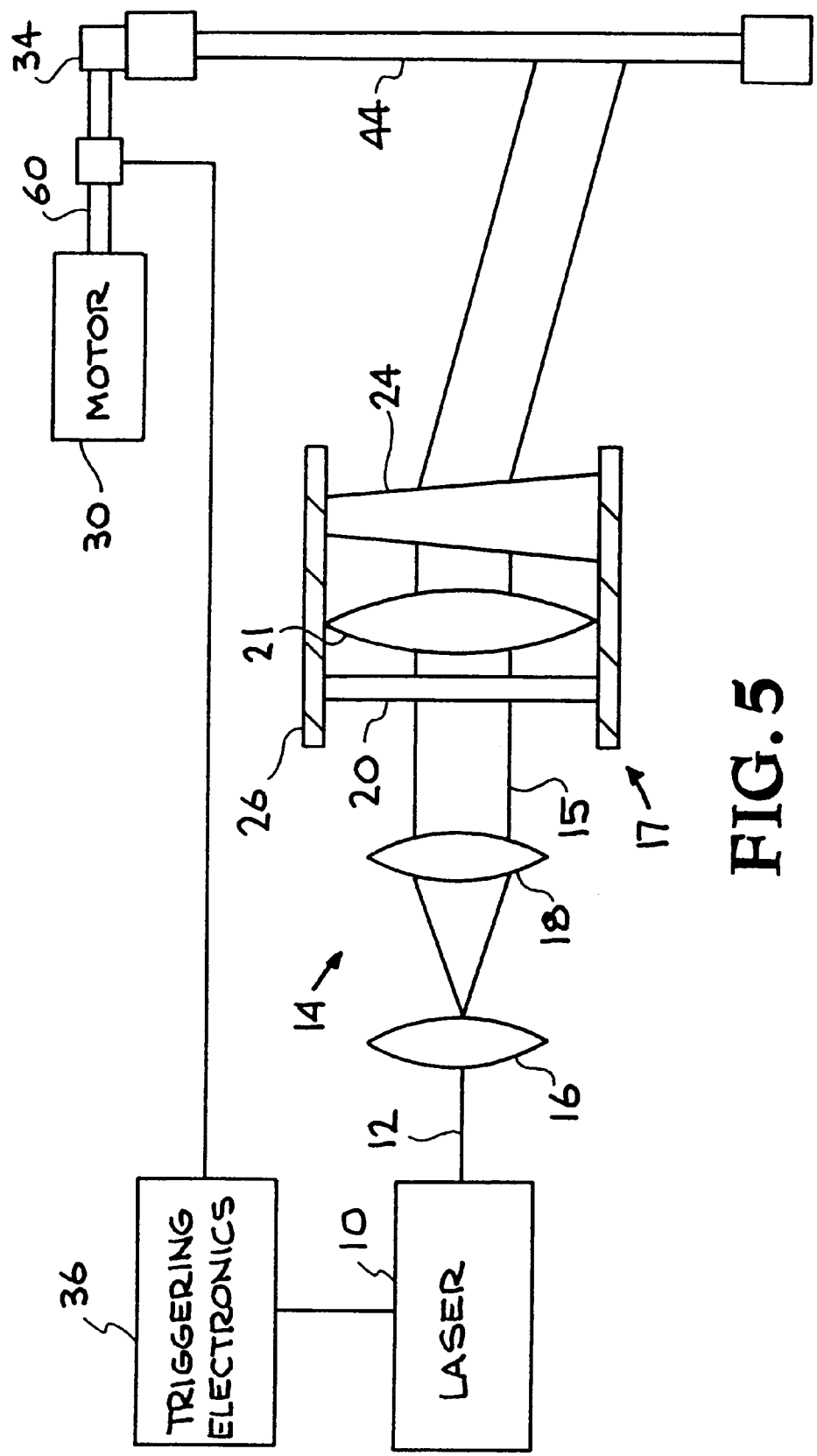
FIG. 5 shows an embodiment of the laser patterning system where the magnetic recording media rotates and the array of spots is stationary to produce an annular pattern on the magnetic recording media.

In an embodiment shown in FIG. 5, where elements similar to the embodiment of FIG. 1A are similarly numbered, the magnetic recording media 44 may be rotated while the optical assembly 17 is held in a fixed position. To accomplish rotation of the magnetic recording media, a motor 30 with shaft 60 turns a planetary gear train 34 which drives the magnetic recording media 44. Shaft 60 may include a precision encoder to provide position information of the array of spots relative to the magnetic recording media. This precision position information is used by triggering electronics 36 to triggers laser 10 thus providing a sychronized laser pulse to the system. In this embodimant, the synchronized pulse of laser light 12 is expanded by beam expanding telescope 14, passes through phase plate 20 and lens 21, and may the be deflected by deflection wedge 24 or this element may be omitted, and the beam 15 exiting focusing lens 21 may be off-set from the center of rotation of the magnetic recording media, to provide an annular array of spots on the rotating magnetic recording media. As shown in FIG. 1B, a shear plate may be used to precisely focus the system.

Changes and modifications in the specifically described embodiments can be carried out without departing from the scope of the invention, which is intended to be limited by the scope of the appended claims.

What is claimed is:

1. An apparatus for patterning magnetic recording media, comprising:

means for producing at least one synchronized pulse of laser light, wherein each pulse of said at least one synchronized pulse of laser light is synchronized to fire at the appropriate time to generate a spot at a plurality of desired positions on a target;

means for producing an array of spots from said at least one synchronized pulse of laser light; and means for rotating said array of spots relative to said magnetic recording media, wherein said means for producing at least one synchronized pulse of laser light comprise:

a laser for producing a laser beam;

an alignment disk having a central opening, wherein said alignment disk comprises index holes evenly spaced along its outer perimeter, wherein the outer radial edge of said alignment disk comprises a first set of gear teeth; and a triggering system, comprising:

a light emitting diode for generating a laser triggering beam;

a photodiode for detecting said laser triggering beam, wherein said alignment disk is positioned between said light emitting diode and said photodiode such that light will periodically pass through said index holes as said alignment disk rotates; and triggering electronics electrically and operatively connected to said photodiode and said laser, wherein said triggering electronics will provide a trigger pulse to said laser when said photodiode detects said triggering beam from said light emitting diode.

2. The apparatus of claim 1, wherein said alignment disk comprises 18 index holes.

3. The apparatus of claim 1, wherein said means for producing an array of spots from said at least one synchronized pulse of laser light comprises a phase plate to produce a wavefront having at its far field a near-equal intensity array of spots.

4. The apparatus of claim 3, wherein said phase plate comprises a binary surface relief pattern.

5. The apparatus of claim 3, wherein said phase plate comprises a Dammann grating.

6. The apparatus of claim 3, wherein said phase plate comprises a multi-level phase grating.

7. The apparatus of claim 1, wherein said at least one synchronized pulse of laser light comprises (i) about 20 mJ per pulse, (ii) a pulse length of 10 to 25 ns and (iii) output pulses at a rate of 6 Hz.

8. The apparatus of claim 1, wherein each spot of said array of spots comprises 10 $\mu$m diameter spots formed by 4 $\mu$J per pulse.

9. The apparatus of claim 1, wherein said means for rotating said array of spots are configured to slowly rotate through a complete annulus of the pattern projected onto a disk in 3 seconds, wherein said rotatable optical assembly is rotated at ⅓ Hz rate.

10. The apparatus of claim 1, wherein said laser spot array comprises a contiguous repetition of unit cells in x- and y-directions, wherein each unit cell in turn comprises a distribution of regions that introduce phase delays of 0 or $\pi$ to said at least one synchronized pulse of laser light.

11. The apparatus of claim 1, wherein said laser spot array comprises a 60 by 60 spot array.

12. The apparatus of claim 1, wherein said means for rotating said array of spots relative to said magnetic recording media include means for rotating said magnetic recording media.

13. The apparatus of claim 1, wherein said means for producing an array of spots includes an opaque mask for aperturing unwanted laser light from said magnetic recording media.

14. The apparatus of claim 1, further comprising means for precisely positioning said magnetic recording media at the focal point of said array of spots.

15. An apparatus for patterning magnetic recording media, comprising:

means for producing at least one synchronized pulse of laser light, wherein each pulse of said at least one synchronized pulse of laser light is synchronized to fire at the appropriate time to generate a spot at a plurality of desired positions on a target; and means for producing an array of spots from said at least one synchronized pulse of laser light, wherein said means for producing an array of spots from said at least one synchronized pulse of laser light comprise:

a beam expanding telescope for producing an expanded laser beam; and an optical assembly, comprising:

a phase plate to produce a wavefront having at its far field a near-equal intensity spot array;

a lens to focus said wavefront;

a deflection wedge; and a cylindrical optical mount having an inner and outer surface, wherein said phase plate, lens and deflection wedge are mounted in tandem on said inner surface, wherein said optical assembly is positioned to receive and transmit said expanded laser beam to produce said near-equal intensity spot array.

16. The apparatus of claim 15, wherein said phase plate comprises a binary surface relief pattern.

17. The apparatus of claim 15, wherein said phase plate comprises a Dammann grating.

18. The apparatus of claim 15, wherein said phase plate comprises a multi-level phase grating.

19. An apparatus for patterning magnetic recording media, comprising:

means for producing at least one synchronized pulse of laser light, wherein each pulse of said at least one synchronized pulse of laser light is synchronized to fire at the appropriate time to generate a spot at a plurality of desired positions on a target;

means for producing an array of spots from said at least one synchronized pulse of laser light; and means for rotating said array of spots relative to said magnetic recording media, wherein said means for rotating said array of spots comprises:

a first set of gear teeth located on the outer radial edge of an alignment disk;
a deflection wedge fixedly attached to a cylindrical optical mount fixedly attached to an inner opening of said alignment disk; and
an alignment disk driving system comprising:
a motor;
a shaft having a first end and a second end, wherein said first end is fixedly attached to said motor; and
a gear member fixedly attached to said second end of said shaft, wherein said gear member comprises a second set of gear teeth which mesh with said first set of gear teeth, wherein said means for producing an array of spots are connected to an inner opening of said alignment disk, wherein said motor provides rotation of said shaft and gear member which rotates said alignment disk which rotates said array of spots.

20. The apparatus of claim 19, wherein said means for rotating said array of spots produces an annular pattern of spots.

21. The apparatus of claim 20, wherein said array of spots comprises 10 micron diameter spots spaced 50 μm in the radial direction and 100 μm along the arc length of a section of said annular pattern, wherein the annulus diameter is 35 mm, wherein said annular pattern is made by an adjoining set of annular sections each with 17.5 mm radius, 3 mm thickness and an arc length of 6.11 mm (20° arc length), wherein each segment consists of an array of 60×60 spots, wherein said annular pattern of spots comprises 18 segments.

22. A system for patterning magnetic recording media, comprising:
a laser for producing a laser beam;
a beam expanding telescope for producing an expanded laser beam from said laser beam;
an optical assembly, comprising:
a phase plate comprising a binary surface relief pattern to produce a wavefront from said expanded laser beam, wherein said wavefront has at its far field a near-equal intensity spot array;
a lens to focus said wavefront;
a deflection wedge to deflect said wavefront; and
a cylindrical optical mount having an inner and outer surface, wherein said phase plate, lens and deflection wedge are mounted in tandem on said inner surface,
wherein said optical assembly is positioned to receive and transmit said expanded laser beam to produce said near-equal intensity spot array;
an alignment disk having a central opening fixedly attached to said outer surface of said cylindrical mount, wherein said alignment disk comprises 18 index holes evenly spaced along its outer perimeter, wherein the outer radial edge of said alignment disk comprises a first set of gear teeth;
an alignment disk driving system comprising:
a motor;
a shaft having a first end and a second end, wherein said first end is fixedly attached to said motor; and
a gear member fixedly attached to said second end of said shaft, wherein said gear member comprises a second set of gear teeth which mesh with said first set of gear teeth; and
a triggering system, comprising:
a light emitting diode for generating a laser triggering beam;
a photodiode for detecting said triggering beam, wherein said alignment disk is positioned between said light emitting diode and said photodiode such that light will periodically pass through said index holes as said alignment disk rotates; and
triggering electronics electrically and operatively connected to said photodiode and said laser, wherein said triggering electronics will provide a trigger pulse to said laser when said photodiode detects said trigger beam from said light emitting diode.

* * * * *